United States Patent [19]
Couture

[11] 3,823,603
[45] July 16, 1974

[54] ULTRASONIC INSPECTION APPARATUS
[75] Inventor: John W. Couture, Danbury, Conn.
[73] Assignee: Automation Industries, Inc., Los Angeles, Calif.
[22] Filed: Sept. 7, 1971
[21] Appl. No.: 178,485

Related U.S. Application Data
[63] Continuation of Ser. No. 813,553, April 4, 1969, abandoned.

[52] U.S. Cl. ............................................... 73/67.9
[51] Int. Cl. ........................................... G01n 29/04
[58] Field of Search ........................... 73/67.7–67.9

[56] References Cited
UNITED STATES PATENTS
| | | | |
|---|---|---|---|
| 2,883,860 | 4/1959 | Henry | 73/67.9 |
| 3,169,393 | 2/1965 | Stebbins | 73/67.9 |
| 3,262,306 | 7/1966 | Henry | 73/67.9 |

FOREIGN PATENTS OR APPLICATIONS
| | | | |
|---|---|---|---|
| 1,308,800 | 10/1962 | France | 73/67.8 |
| 1,329,733 | 5/1967 | France | 73/67.8 |
| 1,546,786 | 10/1968 | France | |

Primary Examiner—Richard C. Queisser
Assistant Examiner—John P. Beauchamp
Attorney, Agent, or Firm—Dan R. Sadler

[57] ABSTRACT

An ultrasonic nondestructive test system as described which includes signal attenuation means. The system includes a transducer, a transmitter and a receiver for displaying on a cathode ray tube defects or other discontinuities in the workpiece. An attenuator circuit is coupled before the receiver and is gated on and off at predetermined times and especially if a receiver has been adjusted to a high gain for detection of small defects beneath the surface of the workpiece. After the receiver receives part of its initial interface return signal, portions of the initial interface signal are abruptly attenuated by gating the attenuator.

2 Claims, 4 Drawing Figures

John W. Couture,
INVENTOR.
BY.
ATTORNEY.

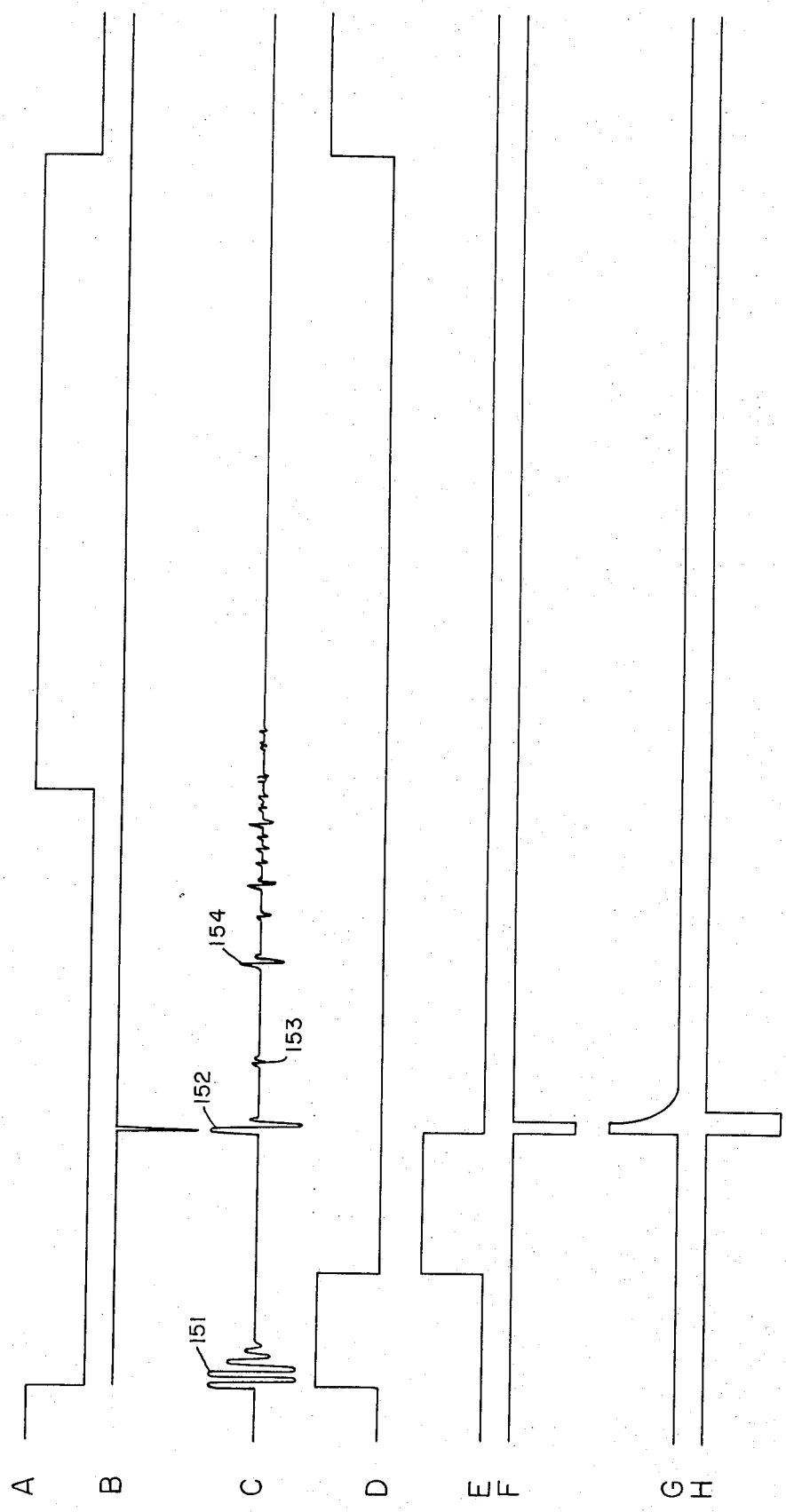

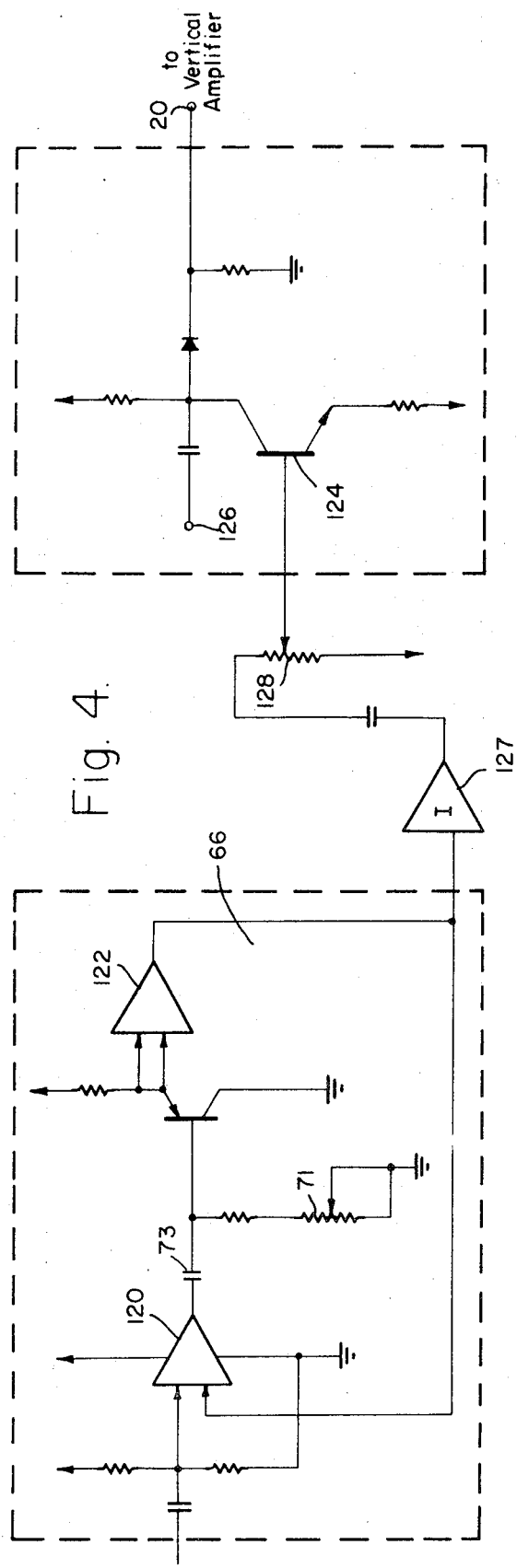
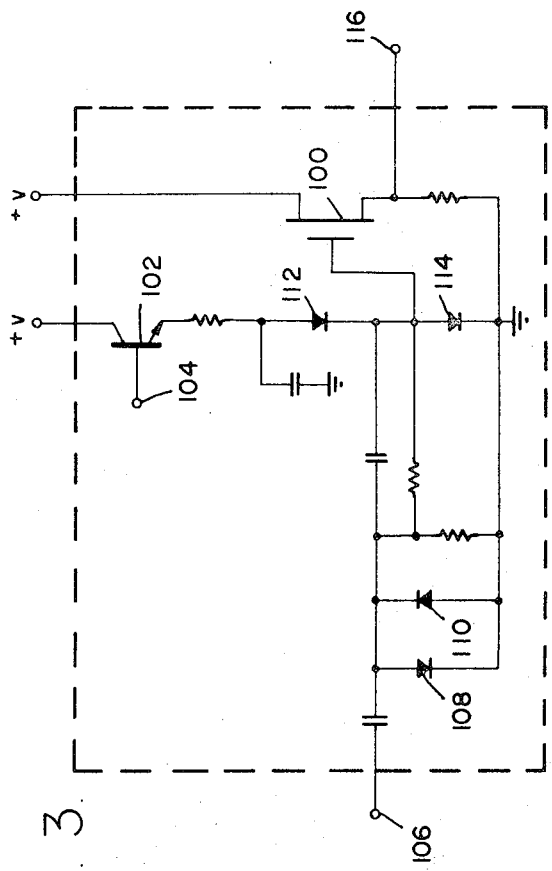
Fig. 4.
Fig. 3.
John W. Couture,
INVENTOR.
BY.
ATTORNEY.

ULTRASONIC INSPECTION APPARATUS

This is a continuation of application Ser. No. 813,553, filed Apr. 4, 1969 now abandoned.

BACKGROUND OF THE INVENTION

A. Field of the Invention

This invention relates to nondestructive test instruments and more particularly to novel and improved ultrasonic testers with improved signal resolution, and especially adapted to resolve small surface defects in a workpiece from initial interface signals.

B. Discussion of the Prior Art

In the art of nondestructive material testing there is provided an instrument for inspection by means of ultrasonics. In testing materials in accordance with the techniques described herein, a short high frequency electrical pulse is applied to a search unit comprising a piezoelectric transducer or the like. The frequency of the pulse is in the ultrasonic range. The transducer vibrates at the ultrasonic frequency and is coupled to a workpiece to be tested through an intervening liquid couplant, for example. The ultrasonic vibrations travel through the workpiece under test and are reflected from the surfaces thereof, as well as from any flaw, defect or other discontinuity which may be in the workpiece. Upon striking the transducer, an electrical echo signal is generated. Both the transmitted pulse and its various echoes are amplified and applied to the vertical deflection plates of a cathode ray tube. The horizontal sweep of the cathode ray tube is set so as to provide a visual indication of the depth of the defect.

This type of nondestructive testing has been of great commercial value for a number of years. However, it is not always simple for the operator of such a device to detect defects which occur near the surface of the material. This is due to the present receiver designs, which are inherently susceptible to overload by interface signals when these normal controls have been set for observation of small defects.

SUMMARY

Briefly described, the present invention comprises an attenulator circuit for a test instrument of a nondestructive tester. Return signals generated by acoustic waves hitting the surface of the workpiece are received by a receiver. A small portion of the interface signal is allowed to pass through an attenuator and a receiver. This small portion of the interface signal is ANDed with a delayed signal from the transmitter pulser. This signal activates an attenuator circuit. The activated attenuator then reduces the interface signal which is passing through the receiver. The signal also immediately activates the desired amount of receiver reject as selected by an amplitude control circuit, and is further controlled in width by a variable delay.

It is the action of the attenuation of the interface signal prior to its full entry into this receiver which is responsible for reduction in receiver overloading. The most significant result of the reduction of the receiver overloading caused by the interface signal is a very impressive gain in system resolution. An overloaded receiver is unable to recover rapidly enough to see small defects close to the surface of the workpiece. Receivers which are not overloaded by the interface signal do not have sufficient gain to indicate small defects in the workpiece. A small amount of receiver reject is added to further improve the resolution. The reject, however, is generally set up so that the reject duration lasts for only the first 0.2 inch of testing in the workpiece, as an example. Such a circuit as presented in this embodiment provides an equalization of the interface signals and the defects, which allow a single receiver gain setting for both during testing.

DESCRIPTION OF THE DRAWINGS

These and other features and advantages will become more apparent to those skilled in the art when taken into consideration with the following detailed description wherein like reference numerals indicate like and corresponding parts throughout the several views, and wherein:

FIG. 2 illustrates a graph of wave forms taken along various points in the embodiment of FIG. 1;

FIGS. 3 and 4 are circuit diagrams of various components of FIG. 1.

DESCRIPTION OF ONE PREFERRED EMBODIMENT

Figure 1:
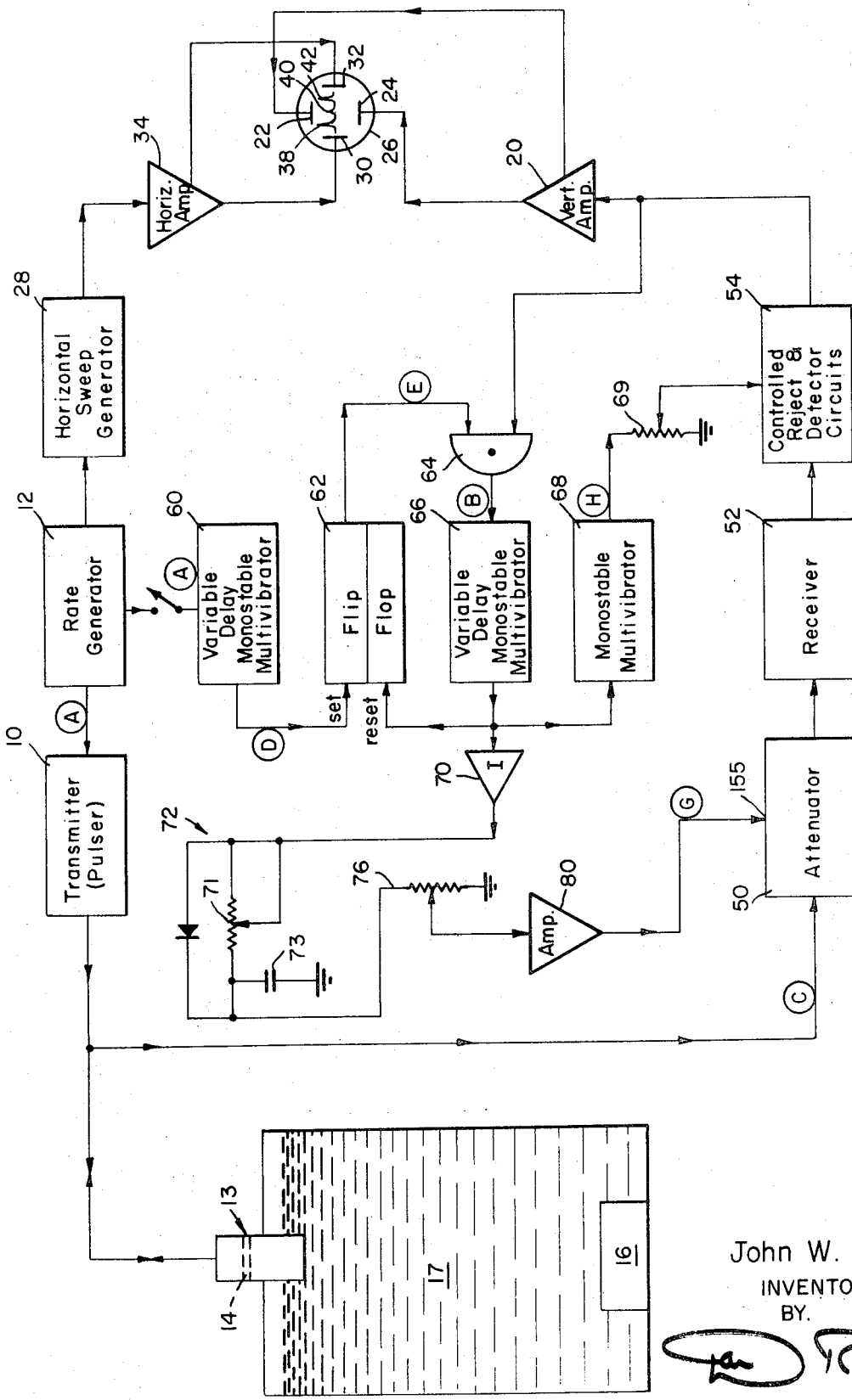
FIG. 1 is a block diagram of the system of this invention.

Turning now to a more detailed description of this invention, there is shown in FIG. 1 an ultrasonic test instrument of the type referred to herein. A pulse generator or transmitter 10 is activated by rate generator 12 to produce ultrasonic pulses which are applied to a search unit 13. The search unit 13 includes a piezoelectric transducer 14 which vibrates in the thickness mode when electrical signals are applied thereto.

Transducer 14 converts the electrical pulses into pulses of acoustic or ultrasonic energy. The ultrasonic energy propagates through the couplant and into the workpiece 16.

Portions of the ultrasonic energy are reflected from the various discontinuities within its path. For example, echoes occur at the interface or reflecting boundary between the couplant and workpiece 16, a defect 18 inside the workpiece, the backside of the workpiece, etc., The energy reflected back to transducer 14 causes the generation of an electrical voltage as shown in Graph C of FIG. 2.

This signal includes a large initial pulse 151 corresponding to the "main bang" or tansmit pulse from the transmitter 10. This is followed by a front interface signal 152 corresponding to the echo from the front of the workpiece 16, a small defect signal 153 (if a defect is present) a rear or backside signal 154. These signals, including the initial electrical impulse and the reflected impulses are coupled by means of an attenuator 50, a receiver 52 and a reject and detector circuit 54 to a suitable amplifier 20. The amplified voltage is then applied across the vertical deflection plates 22 and 24 of the cathode ray tube 26.

A horizontal time base for the cathode ray tube 26 is provided by the horizontal sweep generator 28 through a horizontal amplifier 34. The sweep generator 28 is initiated by rate generator 12 upon generation of the initial impulse. The sweep signal is applied to the horizontal deflection plates 30 and 32 of the cathode ray tube 26.

The cathode ray tube 26 illustrated in FIG. 1 shows three vertical deflections. The first deflection 38 is due to the initial impulse 152 corresponding to the front interface. The second deflection 40 is due to the pulse 153 which corresponds to the reflections from the discontinuity or defect 18. The final deflection 42 is from the pulse 154 corresponding to the echo from the rear surface 19 of the workpiece 16. In the illustration of FIG. 1, the vertical deflection 40 is well separated from the initial impulse deflection 38. However, if a discontinuity or defect 18 is very near the surface of the workpiece 16, it becomes very difficult to distinguish the two deflections.

U.S. Pat. No. 3,274,821 issued on Sept. 27, 1966, to Frederick G. Weighart and assigned to the assignee of this invention best illustrates the problems occurring in prior art systems with return signals from beneath the surface of a workpiece. This patent provides one good solution of this problem. By this invention, as illustrated by the embodiment shown and described herein, an improvement in distance amplitude correction hereinafter referred to as DAC is provided.

An attenuator circuit 50 is coupled between the search unit 13 and a receiver 52. The output of receiver 52 is applied to the vertical amplifier 20 through controlled reject and detector circuits 54. These circuits 54 will be described in more detail in reference to FIG. 5. The rate generator 12 provides a signal as shown in Graph A of FIG. 2. This signal which occurs at and defines the pulse repetition rate of the entire system is applied to the transmitter pulser 10 so as to trigger it. The signal is also applied to a variable delay monostable multivibrator 60. The output from the multivibrator 60 provides a square wave having a predetermined length of time. Normally the length of time that the multivibrator 60 stays "ON" is equal to the time required for the ultrasonic energy to make a round trip equal to half the distance between the surface of the search unit 13 and the workpiece 16. The time duration of the square wave relative to the interface signal 152 is illustrated in Graph D.

After the "ON" time of multivibrator 60 (i.e., the end of the square wave D), a flip-flop 62 is set in a true state. This, in turn, provides an output signal to one side of an AND gate 64, as shown on Graph E of FIG. 2. The output circuit of AND gate 64 is directly coupled into a further variable delay monostable multivibrator 66. The other input to AND gate 64 is coupled to the output circuit of the detector circuit 54. During the "TRUE" time of flip-flop 62 if an output signal is present on the output of the detector circuit 54, a signal passes through the AND gate 64 and switches the delay monostable multivibrator 66. This output from AND gate 64 is best illustrated by the waveform in Graph B of FIG. 2, while the output of the delay monostable multivibrator 66 switches a further multivibrator 68. The signal from multivibrator 68 is shown in Graph H of FIG. 2. This square wave represents the reject area into the controlled reject and detector circuit 54, hereinafter to be described.

The signal appearing from multivibrator 66 will then immediately reset the flip-flop 62 which disenables or "CLOSES" the AND gate 64. The signal from the multivibrator 66 is then inverted through an inverter 70. The inverted signal is then applied through an interface attenuation slope control circuit 72, interface attenuation amplitude control circuit 76 and amplifier 80 to the control input 155 of the attenuator 50. During the period that a signal is applied to the control input 155 of the attenuator 50, the input signal received from the search unit 13 is attenuated for a predetermined time.

As noted in the operation of this system, when a return signal first appears, it is applied through a attenuator 50, receiver 52 and reject-detector circuits 54 and into one side of the AND gate 64. The AND gate 64 is normally maintained "OPEN" during this specific pulse time by the sequence of signals initiated by the rate generator 12, the multivibrator 60 and flip-flop 62. The AND gate 64 then switches the multivibrator 66 which, in turn, applies a signal through the inverter 70, slope control 72, amplitude control 76 and amplifier 80 to the control input 155 of the attenuator 50. As a result, substantially simultaneously with or shortly after the interface signal first appears in the attenuator 50, the amount of attenuation is momentarily greatly increased. As a consequence, the front interface signal is greatly attenuated. The amount of this attenuation lasts for a predetermined time.

The amount and duration of the attenuation corresponds to the wave form in FIG. 2G. The attenuation instantly rises to a high enough level to reduce the amplitude of the large front interface signal 152 to an amount which is clearly within the dynamic range of the high gain receiver 52. Thus, even though the front interface signal 152 may initially be many, many times greater than the defect signal 153, it will be reduced to a level whereby the receiver 52 will not be swamped or blocked. Thus, all of the signals including even the surface reflections are detected on a high gain receiver 52 and resolved by the adjustment to the attenuator 50.

Interface amplitude control 69 functions as follows. There is an optimum gain setting which yields the best signal-to-noise ratio in any receiver which may be overloaded. It is the purpose of this control 69 to find this optimum gain and adjust the system for best operation. Interface slope control 72 adjusts the time that the attenuatorr 50 takes to return from maximum attenuation to minimum attenuation. If this return is instantaneous or too rapid, transients occur whereby the receiver 52 will respond by making spurious signals. These will tend to confuse the operator. If the slope were too slow, unwanted effects would also be noticed, so there is also an optimum setting for slope as shown in Graph G of FIG. 2. By varying the adjustment of the potentiometer 71, the rate at which the condenser 73 discharges is set so as to define the shape of the trailing edge of the waveform G.

The controlled reject and detector circuit 54 aids in detecting the desired near surface defects. It aids by discriminating against the lower level noise signals arriving at the same time as the near surface defects. By controlling the amount of reverse bias on the detector circuit 54 applied to the interface amplitude control 69, the lower level signals are unable to become detected. This is because any detectable signal amplitude must equal reject level plus diode drop in order to pass through the detector 54.

Referring now to FIG. 3, there is shown an example of an attenuator circuit comprising a field effect transistor 100 and an NPN transistor 102. Transistor 102 forms a part of the amplifier 80 and receives its base signal through the slope control circuitry 72 and 76 on the terminal 104. The terminal 106 receives its signal from the search unit 13 and is clipped by the diodes 108 and 110. Gate attenuation for the field effect transistor 100 is provided from the emitter of transistor 102 operating in conjunction with the diodes 112 and 114. These diodes 112 and 114 provide a signal divider between their dynamic on or conducting impedance and resistor 150. This in turn determines the amount of attenuation provided in the output from the field effect transistor 100. The output terminal 116 of this attenuator circuit is applied through the receiver 52. Although only a single analog attenuator has been shown herein, it should be understood that many modifications and various other types of attenuator circuits can be used herein without departing from the spirit and scope of this invention, as this circuit has only been shown as an example.

FIG. 4 illustrates a typical variable delay monostable multivibrator comprising the operational amplifiers 120 and 122. This particular monostable provides the interface reject with adjustment in multivibrator 68 of FIG. 1 and applies this to the controlled reject circuits. The RF signal from the receiver is applied to the collector of a transistor 124 at the terminal 126 thereof. The signal is then inverted and passed through an interface reject and amplitude control in the form of a potentiometer 128 and also the collector of transistor 124 is coupled to the vertical amplifier 20.

Thus the control reject and detector circuit operates in conjunction with attenuator 50 and assures that portions of the signal are rejected during the attenuation time. Thus the small amount of receiver reject added by the circuit 54 adds to further improve the resolution of the received signal. The reject, however, is generally set up so that the reject duration lasts only for the first 0.2 of an inch of workpiece.

Thus, by this disclosure, there has been provided an equalization of the interface signal and the defects which allows a single fixed receiver gain setting for both during testing. By this invention, surface defects are clearly distinguished and resolved by the fact that the ringing of the signal is attenuated during a specific period before it reaches the receiver 52. Thus the receiver 52 can be turned up on high gain for small defect resolution and yet be attenuated during these critical periods.

Having thus described but one preferred embodiment of this invention, what is claimed is:

1. An ultrasonic nondestructive tester for inspecting a workpiece, said tester including a pulse generator effective to produce a series of intermittently occurring timing pulses, a transmitter coupled to said pulse generator and responsive to the timing pulses to produce a corresponding series of driving pulses, an ultrasonic search unit adapted to be acoustically coupled to the workpiece, said search unit being coupled to the transmitter and effective to transmit pulses of ultrasonic energy into the workpiece in response to the driving pulses, said search unit being responsive to the echoes of the ultrasonic energy reflected from the workpiece and to produce a signal corresponding to said echoes, a fist delay monostable multivibrator coupled to the output of said pulse generator, a flip-flop having a SET input and a RESET input, said SET input being coupled to the output of said first delay monostable multivibrator, an AND gate having a first input and a second input, said first input being coupled to the output of said flip-flop, a second delay monostable multivibrator coupled to the output of said AND gate, the output of said second multivibrator being coupled to the RESET input of said flip-flop, an attenuator having a signal input coupled to the search unit and a control input coupled to the output of said second multivibrator, a receiver having a signal input coupled to the output of said attenuator and a signal output coupled to the second input of said AND gate, and display means coupled to the receiver for displaying the received signal.

2. The nondestructive tester of claim 1 including reject means coupled between said receiver and said display means, and means synchronized by said pulse generator for activating said rejection means and blocking said signals reaching said display means for a second preselected time period.

* * * * *